Patented Oct. 22, 1940

2,218,623

UNITED STATES PATENT OFFICE 2,218,623

REFRACTORY MATERIAL AND PROCESS OF PRODUCING THE SAME

Richard W. Ricker, Parkersburg, W. Va., assignor to Libbey-Owens-Ford Glass Company, Toledo, Ohio, a corporation of Ohio No Drawing. Application July 19, 1937, Serial No. 154,396

3 Claims. (Cl. 106—24)

My invention relates to an improved refractory material suitable for building purposes and to the manufacture thereof.

The invention is primarily adapted for the manufacture of building blocks, bricks, tiles and the like, of the so called sand-lime type. Sand-lime brick have been manufactured for many years and these bricks are made from a mixture of sand or silica, hydrated or slaked lime and water. This mixture is placed into molds and pressed after which the brick is removed from the mold and treated with live steam. Some of the earlier sand-lime brick were made without this final steam treatment and were merely allowed to age for several months in storage, but brick made in this manner did not develop as much strength as those made with steam treatment.

Among the objects of my invention is the provision of a refractory material for building purposes which is of exceptional strength and possesses remarkable resistance to heat and moisture, as well as being relatively unaffected by sudden and severe changes in temperature. While the material possesses considerable strength, it has a low resistance to abrasion which is also a decided advantage, especially in the manufacture of relatively large tiles or panels, in that it permits the drilling of holes in the tiles or panels to facilitate the mounting thereof, as well as permitting the grinding of the corners of the bricks, blocks, or tiles with a carborundum wheel to facilitate the fitting and laying thereof.

In the surfacing (grinding and polishing) of glass sheets to produce plate glass, such as in the so-called continuous system, a plurality of sheets of glass mounted upon a series or train of cars or tables are passed in a definite, substantially horizontal path first beneath a series of grinding machines and then beneath a series of polishing machines to surface one side of the sheets, after which the said sheets are turned over upon the tables and again passed beneath the same or a second series of grinding and polishing machines to surface the second side.

The glass sheets are ordinarily secured to the tables by a relatively thin layer of plaster of Paris or the like, and to assist in the grinding of the glass an abrasive material, consisting of a mixture of sand and water in proper proportions, is fed upon the surface of the glass. It is customary during the grinding operation to use several grades of sand, starting with a relatively coarse grade for the initial grinding or facing operation and ending with a relatively fine grade for the final smoothing operation preliminary to polishing. The sand is used over and over until it becomes too fine even for use in the final smoothing operation, and when this occurs it is discharged as waste material from the abrasive grading system. A large amount of this waste material is accumulated by any glass grinding and polishing plant and the disposal thereof has always presented a major problem to the glass manufacturer.

An analysis of the waste material accumulated by the assignee company shows that it is composed of approximately the following ingredients in the approximate proportions given:

| | Percent |
|---|---|
| Silica | 78.2 |
| Plaster of Paris | 5.0 |
| Lime | 0.3 |
| Iron oxide | 1.7 |
| Glass | 14.0 |
| Alumina | 0.8 |
| Total | 100.0 |

The average grading of this material is as follows:

| Mesh size | Percentage retained |
|---|---|
| 80 | Very few particles. |
| 100 | Few particles. |
| 150 | 0.1%. |
| 200 | 0.3%. |
| 250 | 0.8%. |
| 325 | 1.9%. |
| 400 | 6.2%. |
| 700 | 36.3%. |

The grading of the waste material was determined by the elutriation or water flotation process, and it will be seen that a large percentage of the material is very fine. In fact, the waste material is of such fineness that in excess of fifty percent thereof is smaller than 700 mesh in size. The waste material contains a relatively large percentage of finely divided glass or cullet which represents the particles ground from the glass sheets during the grinding operation. The plaster of Paris present in the waste material is that which finds its way into the abrasive system upon cleaning of the glass supporting tables.

I have discovered, as the result of considerable experimentation and research work, that this waste grinding sand can be satisfactorily utilized as the basis for a composition or batch for the manufacture of a refractory material highly suitable for use in making molded blocks, bricks, tiles, and the like. By way of example, this composition or batch is preferably composed of the following ingredients in the approximate proportions given:

| | Parts by weight |
|---|---|
| Waste grinding sand | 100.0 |
| Hydrated lime | 20.0 |
| Wood rosin | .5 |
| Water | 24.0 |

In carrying out the invention, the above ingredients are first thoroughly mixed together after which the mixture is placed in a mold and subjected to a pressure of approximately 5000 pounds per square inch after which the article is removed from the mold and placed in an autoclave where it is treated with live steam at a pressure of approximately 100 pounds per square inch and at a temperature of approximately 325° F.

Blocks have been actually produced by me in accordance with the above method and tests thereof have clearly demonstrated that the material possesses considerable strength while having a low resistance to abrasion; also that it has remarkable resistance to heat and moisture as well as being relatively unaffected by sudden and severe changes in temperature. For instance, test pieces where placed in water and after remaining therein for several weeks showed no change. Also, an oxygen-gas flame (temperature about 3200° F.) impinging on a corner of the block caused only fine cracks on the surface thereof and no spalling resulted when the heated block was plunged into water.

The presence of the finely ground glass in the waste grinding sand is also of advantage in making a refractory material according to the above process. Thus, the sand or silica is more inert than glass and accordingly the reaction of the lime with the glass will proceed more rapidly than lime with silica to produce the calcium hydrosilicate so that the induration time can be shortened or a lower steam pressure can be used. Lime being a common constituent in glass, less lime would be required when using the waste grinding sand, than if a straight silica sand were employed. The use of waste grinding sand is also advantageous because of the extreme fineness of grain of the sand, while the impurities included with the silica are in such small amounts as to be of relatively little importance.

It will, of course, be appreciated that the invention is not limited to the specific proportions given above or to the particular temperatures and pressures set forth, but that these are to be considered as approximate only.

I claim:

1. A molded refractory article made from a batch comprising the following ingredients in the approximate proportions set forth; waste grinding material including finely ground sand and finely divided glass particles 100.0 parts by weight, hydrated lime 20.0 parts by weight, water 24.0 parts by weight, and wood rosin 0.5 part by weight.

2. The process of producing a molded refractory article, which consists in first preparing a batch of the following ingredients in the approximate proportions set forth; waste grinding material including finely ground sand and finely divided glass particles 100.0 parts by weight, hydrated lime 20.0 parts by weight, wood rosin 0.5 part by weight and water 24.0 parts by weight; then placing the batch in a mold and subjecting it to a pressure of approximately 5000 pounds per square inch to form the article, removing the article from the mold and subjecting it in an autoclave to live steam pressure of approximately 100 pounds per square inch at a temperature of approximately 325° F.

3. A molded refractory article made from a batch comprising the following ingredients in the approximate proportions set forth; waste grinding material including sand and glass particles of such fineness that in excess of fifty percent thereof is smaller than 700 mesh in size 100.0 parts by weight, hydrated lime 20.0 parts by weight, water 24.0 parts by weight, and wood rosin 0.5 part by weight.

RICHARD W. RICKER.